(12) United States Patent
Crowell et al.

(10) Patent No.: US 8,458,295 B1
(45) Date of Patent: Jun. 4, 2013

(54) WEB CONTENT DISTRIBUTION DEVICES TO STAGE NETWORK DEVICE SOFTWARE

(75) Inventors: Timothy D. Crowell, Independence, MO (US); William R. Trendel, Olathe, KS (US); Craig A. White, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1773 days.

(21) Appl. No.: 11/272,658

(22) Filed: Nov. 14, 2005

(51) Int. Cl.
*G06F 15/16* (2006.01)
*G06F 15/173* (2006.01)
*G06F 17/00* (2006.01)
*G06F 11/16* (2006.01)

(52) U.S. Cl.
USPC .......................... 709/219; 709/223; 707/674

(58) Field of Classification Search
USPC .......... 709/226, 219, 223; 707/674; 714/4.11
See application file for complete search history.

(56) References Cited

U.S. PATENT DOCUMENTS

| | | | | |
|---|---|---|---|---|
| 6,334,149 | B1 * | 12/2001 | Davis et al. ................... | 709/219 |
| 6,466,978 | B1 * | 10/2002 | Mukherjee et al. ........... | 709/225 |
| 6,628,625 | B1 * | 9/2003 | Birdwell et al. .............. | 370/270 |
| 6,988,125 | B2 * | 1/2006 | Elnozahy et al. ............. | 709/203 |
| 7,103,652 | B1 * | 9/2006 | Dobberpuhl et al. ......... | 709/223 |
| 7,117,521 | B2 * | 10/2006 | Puthiyedath .................. | 725/107 |
| 7,149,922 | B2 * | 12/2006 | Sonoda et al. ................... | 714/6 |
| 7,237,008 | B1 * | 6/2007 | Tarbotton et al. ............. | 709/206 |
| 7,478,117 | B1 * | 1/2009 | Lamb et al. ........................... | 1/1 |
| 2002/0013852 | A1 * | 1/2002 | Janik ............................. | 709/231 |
| 2003/0018870 | A1 * | 1/2003 | Abboud et al. ............... | 711/173 |
| 2003/0033383 | A1 * | 2/2003 | Elnozahy et al. ............. | 709/219 |
| 2003/0079016 | A1 * | 4/2003 | Tsao ............................. | 709/226 |
| 2004/0010588 | A1 * | 1/2004 | Slater et al. .................. | 709/224 |
| 2004/0088382 | A1 * | 5/2004 | Therrien et al. .............. | 709/219 |
| 2004/0255000 | A1 * | 12/2004 | Simionescu et al. .......... | 709/208 |
| 2006/0026208 | A1 * | 2/2006 | Zhou .......................... | 707/104.1 |
| 2006/0080370 | A1 * | 4/2006 | Torii et al. ..................... | 707/204 |
| 2006/0218544 | A1 * | 9/2006 | Chakraborty et al. ........ | 717/168 |
| 2006/0236047 | A1 * | 10/2006 | Shitomi ........................ | 711/162 |
| 2006/0277226 | A1 * | 12/2006 | Chikusa et al. ............... | 707/201 |
| 2007/0198685 | A1 * | 8/2007 | Phatak .......................... | 709/223 |
| 2007/0250608 | A1 * | 10/2007 | Watt .............................. | 709/222 |

OTHER PUBLICATIONS

Clark, Elizabeth, "Network Attached Storage Treads New Turf," Jul. 7, 2002, 8 pgs.
"Virtual NAS from Web Office," PC Magazine, Apr. 2003, 1 pg.

* cited by examiner

*Primary Examiner* — Aaron Strange

(57) ABSTRACT

A computer network is provided that includes a wide area network and a local area network. The local area network includes an application server, a plurality of client computers, a content delivery server, and a network-attached storage device. The content delivery server has data storage capacity. The content delivery server is operable to be implemented as a supplemental application server when the file server is inoperable. The network-attached storage device has data storage capacity wherein the wide area network transmits data for storage by the network-attached storage device through the content delivery server during a period of low demand for bandwidth between the local area network and the wide area network.

14 Claims, 2 Drawing Sheets

WEB CONTENT DISTRIBUTION DEVICES TO STAGE NETWORK DEVICE SOFTWARE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the transmission of data in computer networks. More particularly, embodiments of the present invention provide a system and method for using network-attached storage for delivery and storage of data in local area networks.

BACKGROUND OF THE INVENTION

A typical computing network might consist of multiple local area networks (LANs) that are a part of a wide area network (WAN). Each LAN typically consists of multiple client computers that can communicate through a switch, router, or similar device with one or more server computers. The server computers might include an application server, which can perform business logic functions and allow access to databases and/or web pages, a file server, which can store programs and data files, and a content delivery server, which can speed the delivery of content to the client computers by storing content received from the WAN. Other servers that might be used in a LAN include web servers, transactions servers, and database servers and their associated databases.

Data transmission speeds within a LAN are typically higher than those between a WAN and a LAN. Communication of large files, such as streaming audio/video presentations, from a WAN to a LAN can be particularly slow and expensive. To increase speed and decrease cost, the use of content delivery has been developed. With content delivery, large files might be sent from a WAN to content delivery servers in multiple LANs at night when bandwidth demands are reduced. With the files pre-positioned at the LANs in this manner, users can retrieve the files at LAN speeds rather than at WAN speeds. This not only increases performance for the LAN users, it frees the communication channels between the WAN and the LANs for other data during high traffic periods.

SUMMARY OF THE INVENTION

According to one embodiment, method for enhancing survivability and disaster recovery is provided. The method includes providing a wide area network that includes a local area network. The local area network has a content delivery server and a network-attached storage device. When a file server of the local area network fails, the method provides for employing the content delivery server as a supplemental file server of the local area network. The method includes storing at least some survivability components on the network-attached storage device. The method provides for using the at least some survivability components stored on the network-attached storage device to recover portions of the local area network after a failure.

An alternative embodiment discloses a computer network that includes a wide area network and a local area network. The local area network includes an application server, a plurality of client computers, a content delivery server, and a network-attached storage device. The content delivery server has data storage capacity. The content delivery server may be implemented as a supplemental application server when the file server is inoperable. The network-attached storage device has data storage capacity wherein the wide area network transmits data for storage by the network-attached storage device during a period of low demand for bandwidth between the local area network and the wide area network.

Another alternative embodiment is a method for archiving files used within a local area network. The method includes transmitting the archived files to a network-attached storage device within the local area network during periods of high demand for bandwidth between the local area network and a wide area network. The method also includes transmitting the archived files to the wide area network during periods of low demand for bandwidth between the local area network and the wide area network.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

A typical content delivery server can handle only a limited amount of content. Typically, increased storage in a local area network (LAN) was obtained by adding file servers, which are expensive to purchase and costly to install and maintain. In an embodiment, network-attached storage (NAS) is used in conjunction with a content delivery server to handle additional content that could not be handled by the content delivery server by itself. NAS is data storage capacity that a computer can access via a network. NAS is inexpensive and, since a NAS server connects to the network, the NAS server does not have to be physically attached to the content delivery server. The content delivery server can be configured so that it can communicate with the NAS server and effectively give the content delivery server a much higher capacity. Embodiments of the present system disclose a system that provides an affordable means of increased survivability and disaster recovery in LANs by combining content delivery server(s) with NAS. Further, greater efficiencies and improved use of bandwidth between the wide area network (WAN) and LANs may be obtained by combining NAS with content delivery server(s). Also, the present disclosure illustrates how content delivery servers can be leveraged for use as back-ups for launching applications in the event of failure of application servers when the LAN includes the combination of content delivery servers with NAS.

Figure 1:
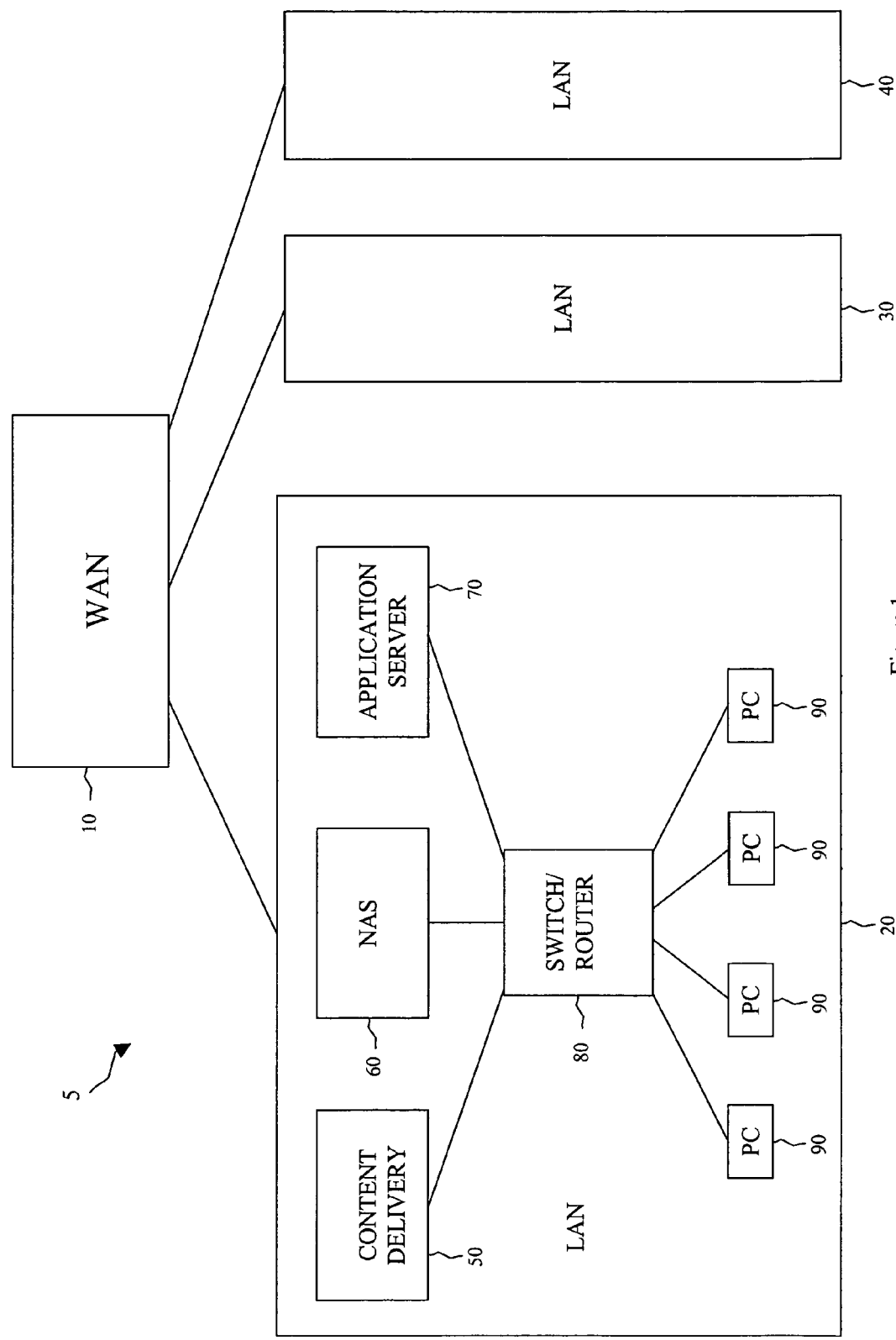
FIG. 1 is a block diagram of a computing network according to an embodiment of the present disclosure.

FIG. 1 illustrates a computer network 5 configured in accordance with an embodiment of the present disclosure. A WAN 10 is connected to LANs 20, 30, and 40. While only three LANs are shown, in other embodiments other numbers could be present. The LAN 20 includes a content delivery server 50, a NAS device 60, and an application server 70. In other embodiments, web servers, transactions servers, database servers, and other types of servers might also be present. The content delivery server 50, the NAS device 60, and the application server 70 are connected through a switch or router 80 to multiple client computers or PCs 90. LAN 30 and LAN 40 might have internal configurations similar to those of LAN 20.

The expanded capacity of the content delivery server 50 allows non-traditional content to be delivered within the LAN 20. That is, in addition to the streaming audio/video content that is traditionally provided via content delivery, other content can be delivered to the PCs 90 in the LAN 20 when NAS 60 is used in conjunction with a content delivery server 50. The use of NAS 60 also allows the content delivery system to be scaled to any desired size.

In addition, a content delivery server 50 that has its storage space expanded through the use of NAS 60 can be administered by a small number of people. This can be contrasted with a situation where content delivery storage space is expanded through the addition of a file server to a LAN. In a system in which a large number of LANs are present, the addition of a file server to each LAN could be prohibitively expensive and could require the employment of a large number of administrative personnel.

Training materials, such as training videos, can serve as one example of traditional content that might be delivered by a content delivery server 50 that is supplemented with NAS 60. An enterprise might send training materials from the WAN 10 to the LANs 20, 30, and 40 during times of low bandwidth demand. The content delivery servers 50 in the LANs 20, 30, and 40 could then provide the training materials as needed by the users. This avoids consuming excessive bandwidth on the WAN link and slowing or halting production activities to provide training.

For example, an enterprise might have a large manual used by customer service representatives that might frequently be updated. The representatives might need to review the manual every morning to check for updates. Instead of the representatives pulling the manual directly from the WAN 10 to their PCs 90 every morning, the manual could be sent from the WAN 10 to the content delivery servers 50 overnight. The representatives could then retrieve the manual at LAN speeds every morning or as needed.

Non-traditional uses that become available when a content delivery server 50 is supplemented with NAS 60 include remote site survivability, disaster recovery, and data storage and archiving. A content delivery server 50 is traditionally not deployed at a remote site for the purpose of keeping the site running. However, when a content delivery server 50 is already present within a LAN 20, and when the storage capacity of the content delivery server 50 is augmented with NAS 60, the content delivery server 50 can be used for such a purpose.

Because of cost constraints, small data centers might not be built to a high level of redundancy and availability. But since a content delivery server 50 might already be present at a small data center, if the content delivery server 50 is augmented with NAS 60, data that would not normally be stored locally can be stored locally. This allows redundancy at small sites that otherwise might not have it and aids in disaster recovery, remote site survivability, and data storage and archiving.

For example, images and configuration files for network devices, local file servers, and local application servers can be stored in the NAS 60. If the connection to the WAN 10 is lost, files can be restored from the NAS 60. In previous systems, if a corrupt configuration file or image caused a loss of connection between a LAN and a WAN, the lack of connectivity would prevent a replacement file from being sent from the WAN to the LAN. Traditionally, a dial-up modem might be used to transfer a replacement file in such a case. Due to the slowness of a dial-up connection, it could take hours to transfer the file and restore the high-speed connection between the WAN and the LAN.

When the images and configuration files of the local network devices and servers associated with the LAN 20 are stored in the NAS 60, the files can be retrieved locally from the NAS 60 at high speeds rather than from the WAN 10 at dial-up speeds. Any missing files can be loaded in seconds and a high-speed connection can be quickly restored.

Traditionally, user files and work group files are backed up through the WAN 10 at a central data center. Every time such files are backed up or retrieved, they are sent over the WAN 10. In an embodiment, key user files and work group files are saved locally during the day on the content delivery box 50 that is augmented with NAS 60. Any files that have changed are replicated to the main data center at night when there is less demand on the connections to the WAN 10. This decreases the time needed to save and retrieve the files and decreases the strain on the WAN 10 during the high-demand daytime hours. Replication of data in multiple places means that if data is lost at the data center, it is retained at the local site, and if data is lost at the local site, it is retained at the data center. If the connection to the WAN 10 is lost, the most recent copies of the files are available locally and users can continue saving and retrieving files.

Multiple applications may be present on an application server 70 within a LAN 20. If an application server 70 has a problem and is unable to launch an application, the application could temporarily be launched on the content delivery server 50. When the content delivery server 50 is augmented with NAS 60, the number of applications that can be launched in this manner is increased.

An enterprise might send data from a WAN 10 to the content delivery servers 50 in multiple LANs 20, 30, and 40 over multiple communication channels. When the content delivery servers 50 are not supplemented with NAS 60, the number of channels that can be used might be limited. When NAS 60 is added to the content delivery servers 50, the number of communication channels can be greatly increased.

In addition to data storage and archiving, a content delivery server 50 supplemented with NAS 60 can be used for maintenance distribution and patch distribution. Traditionally, whenever a software upgrade, virus patch, or similar modification needs to be distributed to multiple PCs on multiple LANs, a separate data stream might be opened from the WAN to each of the PCs. This can cause an excessive strain on the WAN communication channels, especially in a situation where a vulnerability needs to be addressed within a short time frame. In addition, distributing an upgrade or a patch in this manner might require a great deal of file copying and/or scripting in order to install the appropriate files on the appropriate PCs.

In an embodiment, software upgrades, virus patches, and similar modifications are distributed to one or more content delivery servers 50 that are supplemented with NAS 60. For a software upgrade that is not time-critical, the upgrade can be distributed from the WAN 10 to the LAN 20 at night and stored in a content delivery server 50 supplemented with NAS 60. When the users of the PCs 90 log in in the morning, they might be informed that an upgrade is ready to be installed. The upgrade can then be automatically transferred from the content delivery server 50 supplemented with NAS 60 to the PCs 90. Scripts may be present on the content delivery server 50 and/or the NAS 60 to execute the local distribution of the upgrade.

For virus patches and other modifications that need to be distributed as quickly as possible, a multicast can be conducted from the WAN 10 to multiple LANs 20, 30, and 40. A multicast will allow a patch to be distributed quickly but will not significantly strain the communication channels from the WAN 10 and therefore can be done during the day if necessary. Scripts may be present on the content delivery server 50 and/or the NAS 60 to distribute the patches to the PCs 90 within the LAN 20.

A content delivery server 50 supplemented with NAS 60 can also be used for remote performance monitoring and troubleshooting. It may be useful at times to run utilities or applications in order to monitor, maintain, or repair a LAN 20, such as packet capture utilities. In a network in which a large number of LANs 20 are present, it may not be feasible to install in each LAN 20 a server dedicated to running such applications, particularly since such applications might be needed only occasionally. It may also be infeasible to physically deliver a separate, stand-alone monitoring device for temporary use at a site that is experiencing trouble.

In an embodiment, such applications can be distributed as needed to a content delivery server 50 supplemented with NAS 60. The applications can then be launched as needed from the content delivery server 50 or can be distributed from the content delivery server 50 to the PCs 90 and launched from the PCs 90. The applications might be allowed to remain on the content delivery server 50 and/or the PCs 90 for long-term data gathering or might be removed when they are no longer needed.

While many of the above functions could be accomplished by the addition of a file server or similar hardware to the LAN 20, the use of a content delivery server 50 supplemented with NAS 60 allows these functions to be performed without installing hardware that is expensive to purchase and costly to maintain. Also, if a large amount of memory space were available within each LAN 20 in a network, many of the functions described above could be accomplished without the use of NAS 60. However, large amounts of traditional memory and/or storage might be prohibitively expensive to install when a large number of LANs 20 are present. The use of an existing content delivery server 50 supplemented by the relatively inexpensive memory and/or storage of NAS 60 allows these functions to be performed efficiently and inexpensively. The NAS 60, according to one embodiment, is a storage device, such as a data storage device that may be readily coupled to the content delivery server 50 without the complex configuration and on-going maintenance associated with file servers. An example of a NAS 60 is a hard disk drive that may be coupled network and may be addressed on the network after being assigned an IP (Internet Protocol) address. Content delivery servers 50, according to one embodiment, may be identified as systems geared toward delivery of various types of content, such as audio, video, multimedia, other than just standard data files. Content delivery servers 50 may have systems to promote management and support of content such as streaming video.

Figure 2:
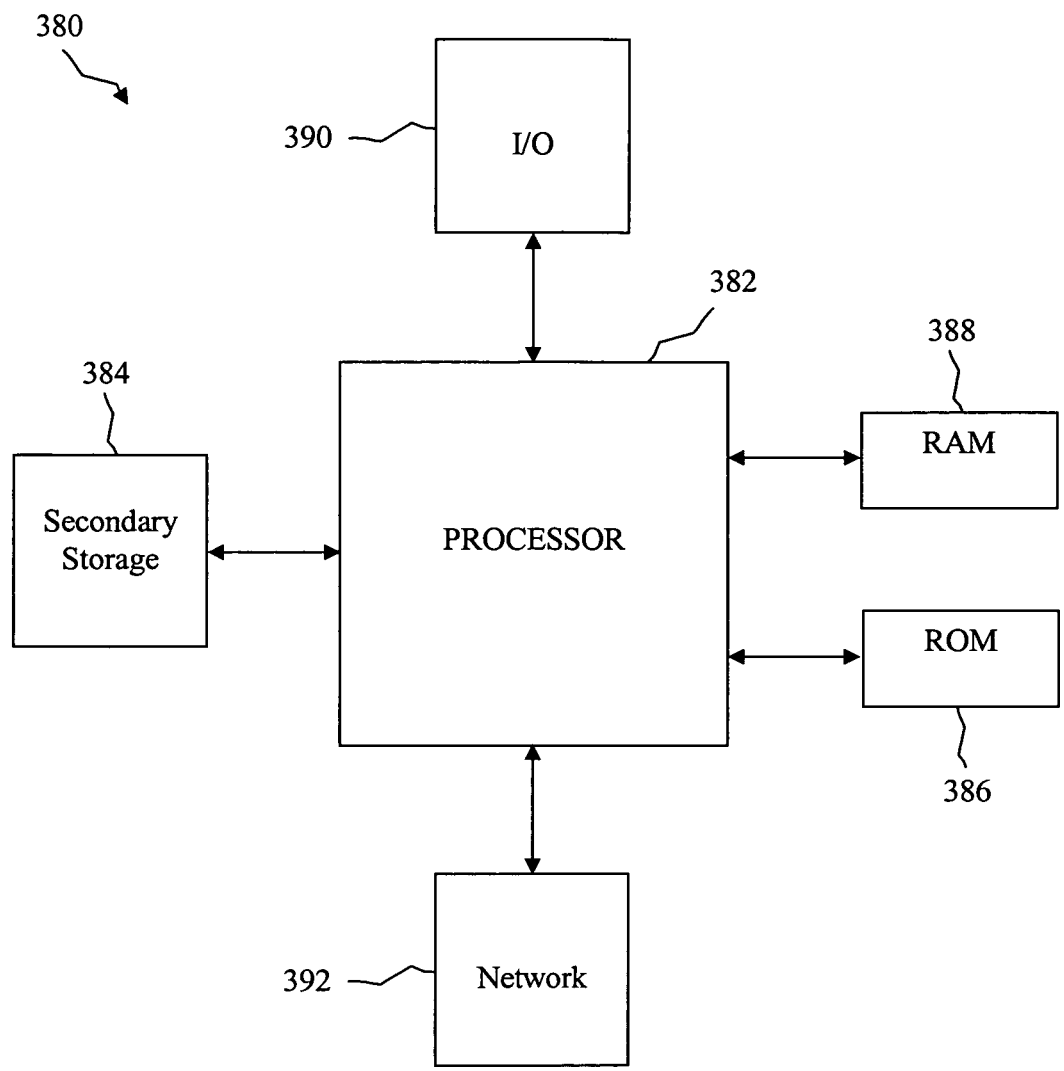
FIG. 2 is an exemplary computer system operable to implement various aspects of the present embodiment.

The system described above may be implemented as part of a computer network and may have components, such as software, applications, or sub-system that may be implemented by any general-purpose computer with sufficient processing power, memory resources, and network throughput capability to handle the necessary workload placed upon it. FIG. 2 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well-known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer network comprising:
   a wide area network; and
   a local area network comprising:
   an application server, wherein the application server is configured to launch one or more applications,
   a plurality of client computers,
   a content delivery server storing content received from the wide area network and configured to enable streaming delivery of the content to one or more of the plurality of client computers within the local area network, and wherein the content delivery server is further configured to be implemented as a supplemental application server when the application server is inoperable, and
   a network-attached storage (NAS) device having data storage capacity,
   wherein the wide area network transmits data for storage by the NAS device through the content delivery server during a period of low demand for bandwidth between the local area network and the wide area network,
   wherein the content delivery server transmits files including image files and configuration files of the application server within the local area network to the NAS device,
   wherein the content delivery server is configured to use the files stored on the NAS device for at least one of disaster recovery and survivability of the application server within the local area network, and
   wherein the files used for the at least one of disaster recovery and survivability of the application server within the local area network are retrieved locally from the NAS device rather than from the wide area network.

2. The computer network of claim 1, wherein the files are transmitted between the NAS device and the client computers during periods of high demand for bandwidth.

3. The computer network of claim 2, wherein user files and work group files used within the local area network are stored in the NAS device.

4. The computer network of claim 2, wherein a software upgrade is transmitted from the wide area network to the NAS device of local area network for distribution to upgrade the one or more client computers.

5. The computer network of claim 2, wherein a remediation for a vulnerability to a client computer is multicast from the wide area network to the NAS device of local area network through the content delivery server.

6. The computer network of claim 2, wherein a performance monitoring utility is transmitted from the wide area network to the local area network.

7. A method for archiving files used within a local area network, comprising:
   transmitting the archived files including image files and configuration files of network devices, local file servers, and local application servers within the local area network to a network-attached storage (NAS) device within the local area network through a content delivery server during periods of high demand for bandwidth between the local area network and a wide area network, wherein the content delivery server stores content received from the wide area network and is configured to enable streaming delivery of the content to one or more of the plurality of client computers within the local area network, and wherein the local application servers are configured to launch one or more applications;
   transmitting the archived files to the wide area network during periods of low demand for bandwidth between the local area network and the wide area network;
   retrieving the archived files locally from the NAS device rather than from the wide area network; and
   using, by the content server, the archived files retrieved from the NAS device for at least one of disaster recovery and survivability of network devices, local file servers, and local application servers within the local area network.

8. The method of claim 7, wherein the archived files include user files and work group files used within the local area network.

9. The method of claim 8, further comprising:
   transmitting a software upgrade for a client computer within the local area network to the NAS device within the local area network during a period of low demand for bandwidth between the local area network and the wide area network; and
   multicasting a remediation for a vulnerability to a component within the local area network from the wide area network to the NAS device.

10. A method for enhancing survivability and disaster recovery, comprising:
    providing a wide area network including a local area network, the local area network having:

a content delivery server storing content received from the wide area network and configured to enable streaming delivery of the content to one or more of the plurality of client computers within the local area network, and a network-attached storage (NAS) device;

when a file server of the local area network fails, employing the content delivery server as supplemental file server of the local area network;

storing at least some survivability components including image files and configuration files for network devices, local file servers, and local application servers within the local area network on the NAS device, wherein the local application servers are configured to launch one or more applications;

retrieving the at least some survivability components locally from the NAS device rather than from the wide area network; and using, by the content server, the at least some survivability components retrieved from the NAS device to recover at least some of the network devices, local file servers, and local applications servers within the local area network after a failure.

11. The method of claim 10, wherein the survivability components are selected from a group of survivability components consisting of network configuration information, desktop configuration information, and application configuration information.

12. The method of claim 10, wherein the survivability components are further defined as user files and work group files.

13. The method of claim 10, wherein local area network failure is further defined as a failure of one or more components of the local area network.

14. The method of claim 10, wherein local area network failure is further defined as a communications failure between one or more components of the local area network and the wide area network.

* * * * *